United States Patent Office 3,213,107
Patented Oct. 19, 1965

3,213,107
VINYLCYCLOHEXENE MONOSULFIDE
Bart J. Bremmer, Midland, Mich., assignor to The Dow Chemical Company, Midland, Mich., a corporation of Delaware
No Drawing. Filed Feb. 23, 1962, Ser. No. 175,307
1 Claim. (Cl. 260—327)

This invention relates to a new chemical compound having particular utility as a vulcanizing and accelerating agent for certain polymeric resins. This compound may be referred to commonly as vinylcyclohexene monosulfide and has the following structure:

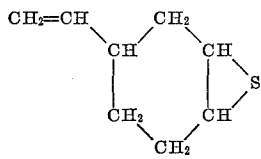

It is more accurately described by its name according to the Chemical Abstracts system of nomenclature, 3-vinyl-7-thiabicyclo[4,1,0]heptane.

This new compound may be conveniently prepared by reacting its oxygen analog, vinylcyclohexene monoxide, with an inorganic thiocyanate in an inert mutual solvent at about 0–100° C. Aqueous lower aliphatic alcohols such as methanol, ethanol, or isopropanol are suitable solvents. The preparation is described in detail in Example 1.

EXAMPLE 1

A reaction flask equipped with a stirrer, a thermometer, and a reflux condenser was loaded with a mixture of 121 g. of potassium thiocyanate, 100 cc. of water, 75 cc. of ethyl alcohol, and 63.3 g. of 3-vinyl-7-oxabicyclo[4,1,0]heptane, the mixture was stirred to dissolve the potassium thiocyanate, and stirring was continued overnight at room temperature. Another 63.3 g. of 3-vinyl-7-oxabicyclo[4,1,0]heptane was then added to the reaction mixture and stirring was continued as before for 36 hours. The reaction mixture was extracted with ethyl ether and upon evaporation of the ether from the extract, 134 g. of crude product was obtained. This crude oil was distilled under high vacuum to obtain a purified fraction boiling at 62° C. at 1.5 mm. Hg. The purified material was a mobile, colorless liquid having a refractive index $n_D^{25°C.}=1.5310$. Elemental analysis showed 22.2% sulfur, calculated for $C_8H_{12}S$, 22.8% S. The infrared spectrum of this purified fraction was consistent with the structure of 3-vinyl-7-thiabicyclo[4,1,0]heptane.

Other inorganic thiocyanates can be used instead of the potassium salt used in Example 1. Suitable salts include ammonium thiocyanate, sodium thiocyanate, and calcium thiocyanate. Preferably an excess of thiocyanate over the theoretical proportion is used to assure complete reaction.

Vinylcyclohexene monosulfide, because of its structure, has a number of varied uses. It is valuable as a chemical intermediate, having two reactive points of attack, namely the vinyl group and the episulfide structure, to either of which may be added various reactants known to the art as reactive with these structures. Having these structures in its molecular configuration, the new compound is also capable of being polymerized under conventional conditions to homopolymers or copolymers having useful properties of their own.

This new compound is specifically useful as a modifying agent for various olefinic polymers and as an accelerating agent for use in curing epoxy resins. Its use as a vulcanizing agent is described in Example 2.

EXAMPLE 2

Samples of a rubbery ethylene-propylene copolymer of 1400–1600 molecular weight and containing about 46 mole percent of ethylene were compounded by cold rolling and cured 20 to 40 minutes respectively at 154° C. In each case, 100 parts by weight of copolymer was compounded with 50 parts of carbon black and 10 parts of Dicup 40 C, a commercial accelerator containing 40% dicumyl peroxide with calcium carbonate, and vulcanizing additive as shown. Other peroxide accelerators may be used in place of the one shown with similar results. The properties of these samples are listed in Table I.

Table 1

| Sample No. | Cure time, minutes | Parts by weight | | Properties | |
|---|---|---|---|---|---|
| | | Sulfur | Sulfide [1] | Tensile strength, p.s.i. | Percent elongation |
| 1 | 20 | | | 1,462 | 283 |
| 2 | 40 | | | 1,565 | 250 |
| 3 | 20 | 1 | | 2,037 | 530 |
| 4 | 40 | 1 | | 1,822 | 253 |
| 5 | 20 | | [2] 4.38 | 2,450 | 541 |
| 6 | 40 | | [2] 4.38 | 2,130 | 383 |

[1] Vinylcyclohexene monosulfide.
[2] Equivalent to one part of sulfur.

For each cure time, the sample compounded with vinylcyclohexene monosulfide showed properties superior to those of samples compounded with sulfur or with peroxide alone.

Vinylcyclohexene monosulfide also has useful biological activity against certain parasitic worms. Substantially complete kill of larval rootknot nematodes is obtained by contacting them with vinylcyclohexene monosulfide in concentrations as low as 10 p.p.m. in water.

I claim:
The compound having the structure

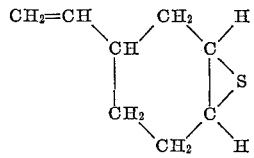

References Cited by the Examiner
UNITED STATES PATENTS

| | | | |
|---|---|---|---|
| 2,094,837 | 10/37 | Dachlauer et al. | 260—327 |
| 2,687,406 | 8/54 | Foster | 260—348 |
| 2,724,719 | 11/55 | Markley et al. | 260—327 |
| 2,765,296 | 10/56 | Strain | 260—348 |
| 2,771,470 | 11/56 | Mark | 260—327 |
| 2,962,457 | 11/60 | Mackinney | 260—327 |

WALTER A. MODANCE, Primary Examiner.
IRVING MARCUS, Examiner.

UNITED STATES PATENT OFFICE
CERTIFICATE OF CORRECTION

Patent No. 3,213,107                      October 19, 1965

Bart J. Bremmer

It is hereby certified that error appears in the above numbered patent requiring correction and that the said Letters Patent should read as corrected below.

Column 2, line 4, before "agent" insert -- vulcanizing --; line 12, for "to" read -- and --.

Signed and sealed this 27th day of September 1966.

(SEAL)
Attest:

ERNEST W. SWIDER                      EDWARD J. BRENNER
Attesting Officer                      Commissioner of Patents